(12) United States Patent
Meier et al.

(10) Patent No.: US 8,734,534 B2
(45) Date of Patent: May 27, 2014

(54) AZO DYES

(75) Inventors: Helmut-Martin Meier, Ratingen (DE); Christof Heide, Bergisch Gladbach (DE); Klaus-Günter Strumpf, Leverkusen (DE); Thomas Hübbe, Köln (DE)

(73) Assignee: Kemira Oyj, Helsinki (FI)

( * ) Notice: Subject to any disclaimer, the term of this patent is extended or adjusted under 35 U.S.C. 154(b) by 0 days.

(21) Appl. No.: 13/882,877

(22) PCT Filed: Nov. 29, 2011

(86) PCT No.: PCT/EP2011/071289
§ 371 (c)(1),
(2), (4) Date: Jun. 17, 2013

(87) PCT Pub. No.: WO2012/072632
PCT Pub. Date: Jun. 7, 2012

(65) Prior Publication Data
US 2013/0255007 A1    Oct. 3, 2013

Related U.S. Application Data

(60) Provisional application No. 61/482,351, filed on May 4, 2011.

(30) Foreign Application Priority Data

Nov. 30, 2010   (EP) .................... 10193153

(51) Int. Cl.
| | | |
|---|---|---|
| C09B 67/00 | (2006.01) |
| C07D 237/00 | (2006.01) |
| C09B 35/037 | (2006.01) |
| C09B 35/023 | (2006.01) |
| C09B 35/04 | (2006.01) |
| D06P 3/28 | (2006.01) |
| D06P 3/68 | (2006.01) |
| C09B 43/00 | (2006.01) |

(52) U.S. Cl.
CPC ............ *C09B 35/037* (2013.01); *C09B 35/023* (2013.01); *C09B 35/04* (2013.01); *D06P 3/28* (2013.01); *D06P 3/68* (2013.01); *C09B 43/00* (2013.01)
USPC .......... 8/640; 8/637.1; 8/639; 8/641; 544/224

(58) Field of Classification Search
CPC .... C09B 35/023; C09B 35/037; C09B 35/04; C09B 43/00; D06P 3/28; D06P 3/68
USPC .................... 8/637.1, 639, 640, 641
See application file for complete search history.

(56) References Cited

U.S. PATENT DOCUMENTS

| | | | |
|---|---|---|---|
| 3,840,514 A | | 10/1974 | Sailer et al. |
| 3,992,143 A | * | 11/1976 | Sommer et al. ............. 8/614 |
| 5,167,703 A | | 12/1992 | Eida et al. |
| 5,198,022 A | | 3/1993 | Aulick et al. |
| 5,288,294 A | | 2/1994 | Kaeser |
| 5,413,630 A | | 5/1995 | Schwarz et al. |
| 5,559,217 A | | 9/1996 | Kaeser |
| 5,663,309 A | * | 9/1997 | Hurter ................. 534/763 |
| 5,883,233 A | | 3/1999 | Catlin et al. |
| 2007/0287830 A1 | | 12/2007 | Sano et al. |
| 2008/0282931 A1 | | 11/2008 | Niven et al. |
| 2010/0292450 A1 | * | 11/2010 | Shiga et al. ............. 534/756 |

FOREIGN PATENT DOCUMENTS

| | | |
|---|---|---|
| GB | 1337896 A | 11/1973 |
| GB | 1563415 A | 2/1980 |
| WO | 2009063880 A1 | 5/2009 |
| WO | WO 2009/063880 A1 * 5/2009 | ............ C09B 31/147 |

OTHER PUBLICATIONS

STIC Search Report darted Aug. 7, 2013.*
The International Search Report and Written Opinion dated Feb. 21, 2012.
The International Preliminary Report on Patentability dated Jun. 13, 2013.

* cited by examiner

*Primary Examiner* — Eisa Elhilo
(74) *Attorney, Agent, or Firm* — Thomas Horstemeyer, LLP

(57) ABSTRACT

The present invention relates to new azo dyes, a process for their preparation, and their use for dyeing or printing fibrous materials, to produce materials with brownish shades.

16 Claims, No Drawings

AZO DYES

CROSS REFERENCE TO RELATED APPLICATION

This application is the 35 U.S.C. §371 national stage of PCT application entitled "AZO Dyes," having serial number PCT/EP2011/071289, filed on 29 Nov. 2011, which claims priority to European Application No. 10193153.3, filing date Nov. 30, 2010, and U.S. Provisional Application No. 61/482,351, filing date May 4, 2011, each incorporated by reference in their entireties.

The invention relates to new azo dyes, a process for their preparation, and their use for dyeing or printing materials, in particular organic or fiber-containing materials, to produce materials with brownish shades.

In order to produce papers with a brown shade, it is known to dye paper with mixtures of different dyes. For example, WO-A 2007/057370 is directed to liquid formulations containing the direct dyes C.I. Direct Brown 44 and Direct Yellow 11. EP-A-1 258 562 relates to dye mixtures containing two anionic dyes each with a different, defined absorption maximum. WO-A 2004/048478 teaches the production of a low-salt liquid formulation of C.I. Direct Brown 44. The production process comprises production of vesuvine from m-phenylenediamine and direct conversion to C.I. Direct Brown 44. Vesuvine and its coupling products, such as C.I. Direct Brown 44, have been known since the beginning of dye chemistry. For instance, the Colour Index (C.I.) shows that C.I. Direct Brown 44 is obtained by formally coupling two parts of sulfanilic acid onto one part of vesuvine (Bismarck Brown C.I. 21000). However, the lightfastness of the produced brown papers is often not sufficient. From JP 2001-004833 A1 there is known a polarizing film for liquid crystal projector including an azo compound of specified structure which contains at least two azo groups linked by three aromatic groups.

In paper mills or paper processing industry, brownish papers often are stored without being prevented from the influence of light or weather, which results in change of color or color shade. Therefore, there is a need for improving the lightfastness of brownish papers.

Surprisingly, it has been found that this problem can be solved by new azo dyes containing at least two azo groups, and aromatic and/or heterocyclic groups. These azo dyes are soluble in water and enable the production of materials, in particular of organic or fiber-containing materials, e.g. paper or board, in brownish shades and with high lightfastness. In particular, it was surprising that the brownish shade could be obtained with the use of one dye only, in contrast to the prior art which commonly uses dye mixtures for that purpose.

Thus, the present invention provides compounds of the general formula (1)

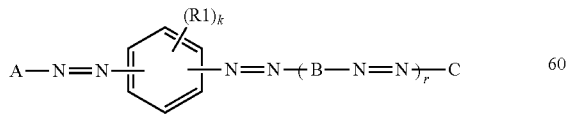

(1)

wherein

R1 represents hydrogen; substituted or unsubstituted $C_{1-5}$-alkyl; substituted or unsubstituted $C_{1-5}$-alkoxyl; substituted or unsubstituted aryl; substituted or unsubstituted phenyl; p-$C_{1-5}$-alkoxyphenyl; di($C_{1-5}$-alkyl)amino groups; amino, sulfonic, carboxyl, hydroxyl, halogen, or nitro groups, wherein R1 is attached to the aromatic ring at any position;

k is an integer from 1 to 4;

r is an integer of 0 or 1;

A, C represent, independently of each other,

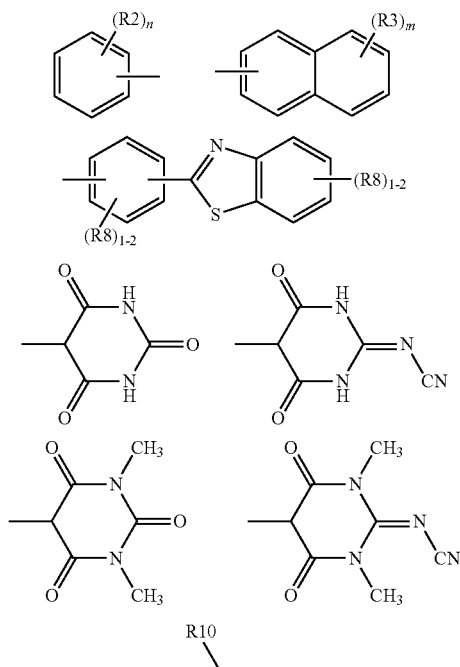

or tautomeric forms

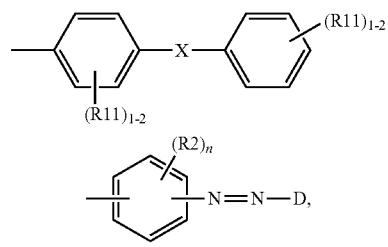

wherein D represents C with the proviso that D is not equal to

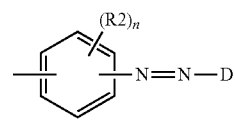

B represents

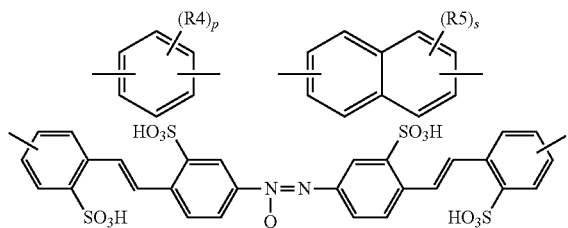

wherein

R2, R3, R4, R5, independently of each other, represent hydrogen; substituted or unsubstituted $C_{1-5}$-alkyl; substituted or unsubstituted $C_{1-5}$-alkoxyl; substituted or unsubstituted aryl; substituted or unsubstituted phenyl; p-$C_{1-5}$-alkoxyphenyl; di($C_{1-5}$-alkyl)amino groups; amino, sulfonic, carboxyl, hydroxyl, halogen, or nitro groups; wherein R2, R3, R4, R5 are attached to the aromatic ring at any position;

and wherein

R8, R10, and R11, independently of each other, represent hydrogen, substituted or unsubstituted $C_{1-4}$-alkyl, substituted or unsubstituted $C_{1-4}$-alkoxy, substituted or unsubstituted aryl; substituted or unsubstituted phenyl; sulfonic, carboxyl, amino, nitro, hydroxyl, or halogen groups, and X represents O, S, NH, $SO_2$, CH=CH, NHCO, NH—CO—NH, N=N, N=N(O);

m, s independently of each other, are an integer from 1 to 4; and n, p independently of each other, are an integer from 1 to 3.

A more preferred compound of formula (1) is represented by formula (1a)

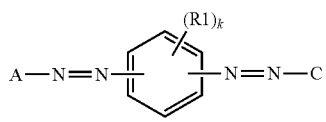
(1a)

wherein

R1 represents hydrogen; substituted or unsubstituted $C_{1-5}$-alkyl, substituted or unsubstituted $C_{1-5}$-alkoxyl, amino, sulfonic, or hydroxyl groups, wherein R1 is attached to the aromatic ring at any position;

k is an integer from 1 to 2;

A, C represent, independently of each other,

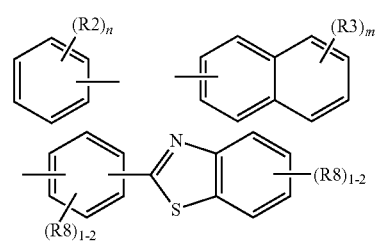

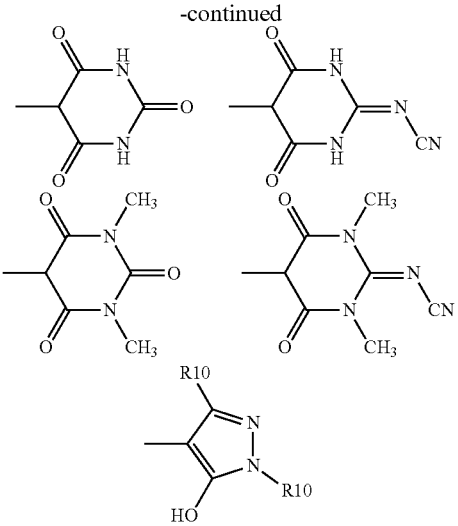

or tautomeric forms m, n independently of each other, are an integer from 1 to 3;

R2, R3, R8, and R10 are defined as described above.

Surprisingly, it was found that compounds of formula (1) are soluble in water, and materials dyed with those dyes show improved lightfastness.

The invention also refers to a process for preparing the compounds of formula (1), comprising diazotizing a compound of formula (2)

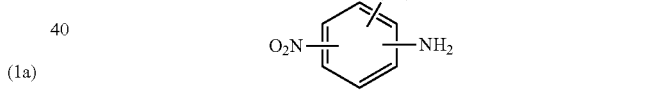
(2)

coupling the obtained product, depending on the value of r (0 or 1), with a compound of the general structure of B or C as defined above. If r is 0, the product is coupled to a compound of the general structure of C. If r is 1, the product is coupled to a compound of the general structure of B followed by diazotizing and coupling to a compound of the general structure of C.

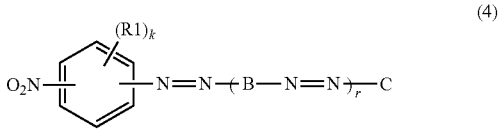
(4)

The resulting compound (4) is treated with a reducing agent, such as sugar, dextrose, formaldehyde, sodium hydrosulfite or hydrogen, to reduce the nitro group to an amino group and yield compound (5).

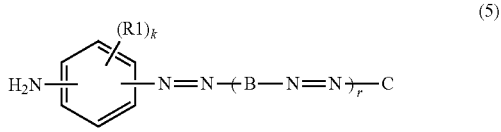

That compound (5) is diazotized and coupled to a compound of the general structure A to obtain the compound of formula (1).

Further, the invention refers to the use of the compounds of formula (1) for dyeing or printing materials, in particular materials containing cellulose and/or polyamide, preferably paper or board. In addition, the invention relates to a process for dyeing or printing materials, in particular materials containing cellulose and/or polyamide, preferably paper or board, and to materials or paper obtained by that process. Preferred embodiments of the invention are described in the description hereinafter and the claims. In the present invention, the term paper is used to cover paper or board.

In formula (1), the substituents R1 to R4, R8, R10 and R11 each are, independently of each other, attached to the corresponding aromatic rings at any position thereof. Likewise, the substituents A, B, C and D are attached to the azo groups at any position. In the context of the invention, the alkyl or alkoxyl group can be linear or branched. If the alkyl, alkoxyl, phenyl or aryl group is substituted, the possible substituents are amino, hydroxyl, sulfonic, or carboxylic groups, which can be attached at any position of the alkyl, alkoxyl, phenyl or aryl group.

In the present invention, a sulfonic group means the group —$SO_3M$, wherein M is a cation. Preferably M is hydrogen, alkaline metal, earth alkaline metal, ammonium, or mono-, di-, tri- or tetra-substituted ammonium, in particular M is mono-$C_{1-5}$-alkyl-, di-$C_{1-5}$-alkyl-, tri-$C_{1-5}$-alkyl-, tetra-$C_{1-5}$-alkylammonium, mono-$C_{1-5}$-hydroxyalkyl-, di-$C_{1-5}$-hydroxyalkyl-, tri-$C_{1-5}$-hydroxyalkyl-, tetra-$C_{1-5}$-hydroxyalkyl-ammonium, or benzyltri-$C_{1-5}$-hydroxyalkyl-ammonium; or ammonium based on amines derived from nitrogen-containing five- or six-membered saturated heterocycles, such as pyrrolidine, piperidine, morpholine or piperazine or their N-monoalkyl- or N,N-dialkyl-substituted products. In the present invention, sulfonic and carboxyl groups are present in the form of free acids or in the form of salts, preferably alkali, earth alkali, ammonium, alkyl ammonium, or alkanol ammonium salts, in particular as alkanol ammonium salts. Preferred ammonium salts are defined above.

The substituents R1 to R4, R8, and R11, independently of each other, preferably represent sulfonic, carboxyl, hydroxyl, methoxy or amino groups. Preferably, R8, R10, and R11, independently of each other, represent hydrogen, substituted or unsubstituted $C_{1-4}$-alkoxy, substituted or unsubstituted aryl, sulfonic, carboxyl, amino, or hydroxyl. In a more preferred embodiment, R10 represents substituted or unsubstituted aryl. In particular, R10 represents hydrogen, $CH_3$, COOH, COOalkyl, Cl, sulfonic (in particular $SO_3H$), or aryl substituted by hydrogen, $CH_3$, COOH, COOalkyl, Cl, or sulfonic (in particular $SO_3H$) groups. In preferred embodiments of formula (1), k is 1 to 3, most preferably 1 or 2.

Preferred compounds of formula (1) are:

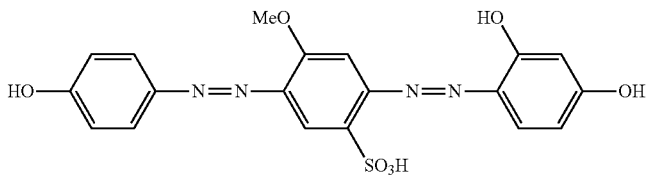

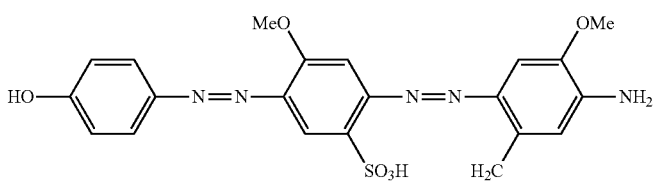

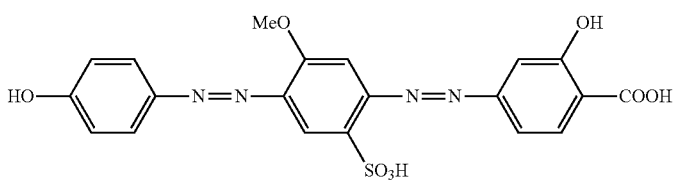

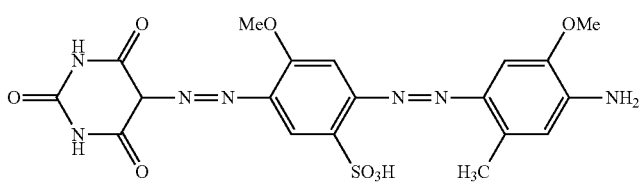

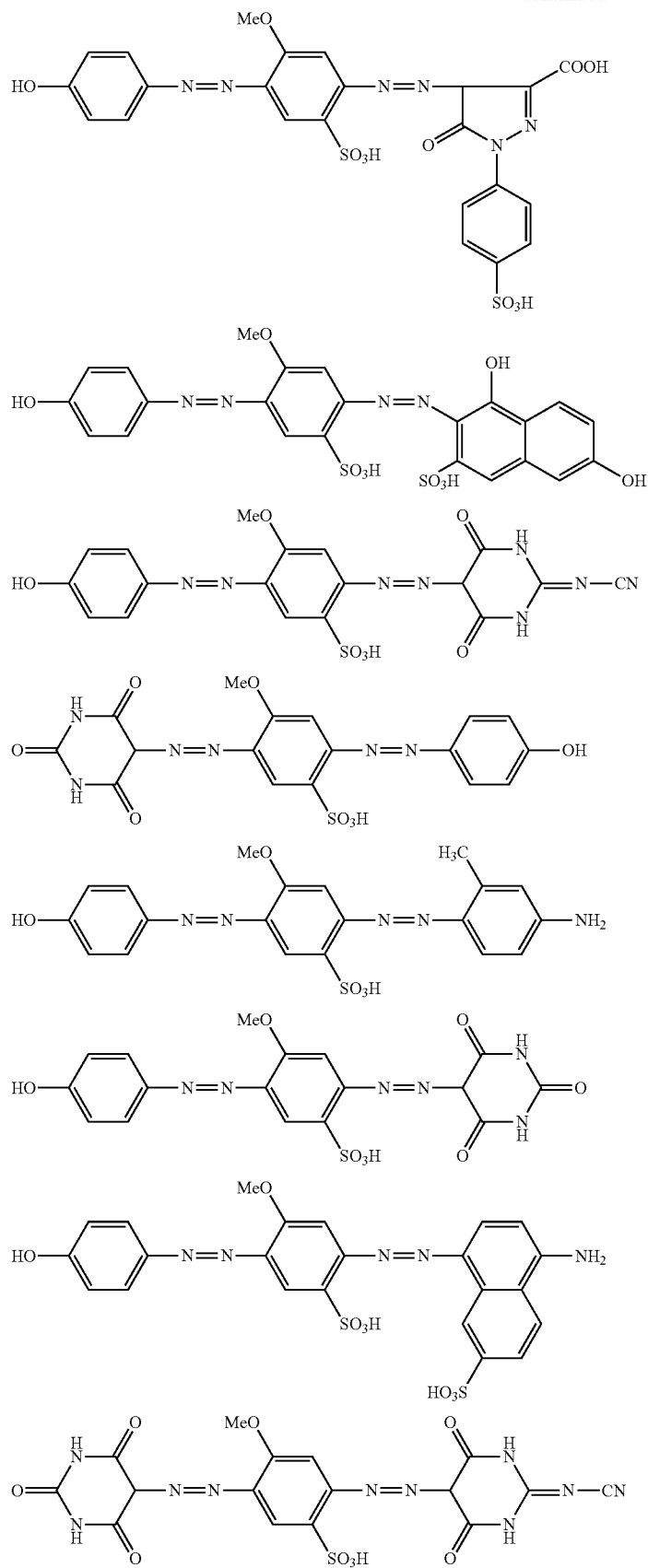

-continued
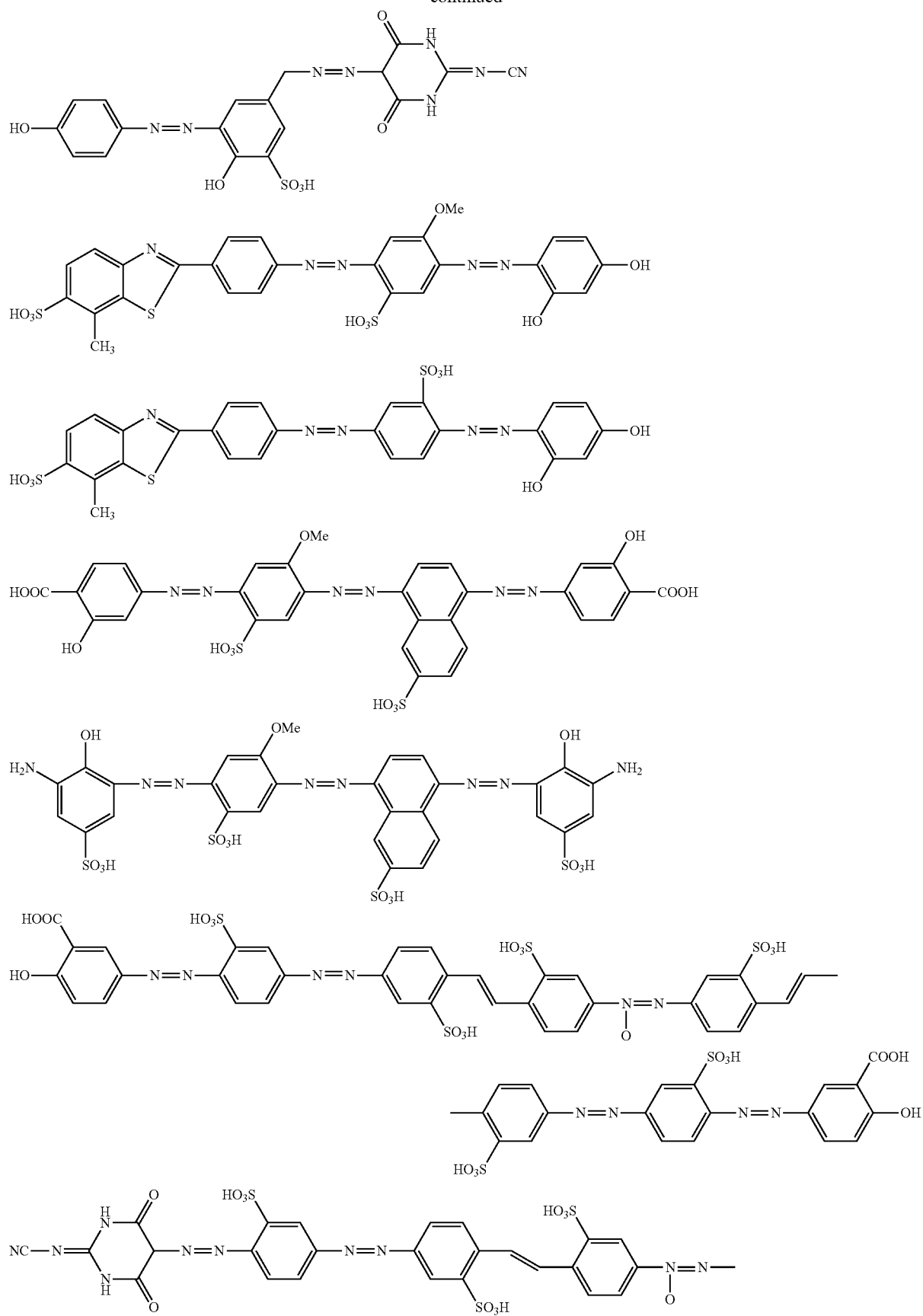

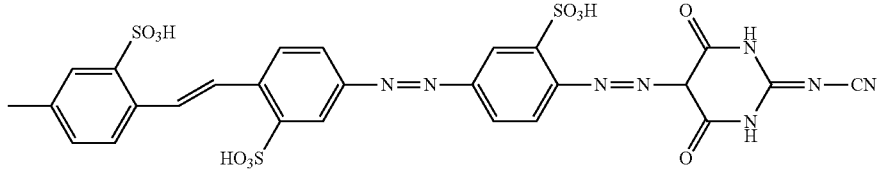
More preferred compounds of formula (1) are:
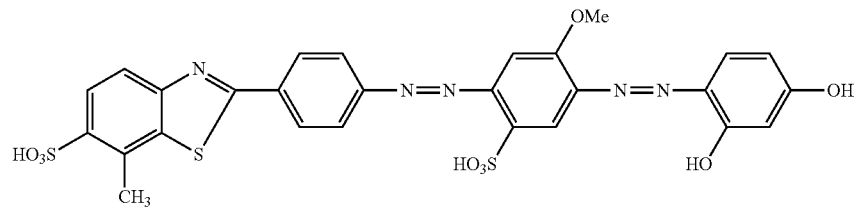
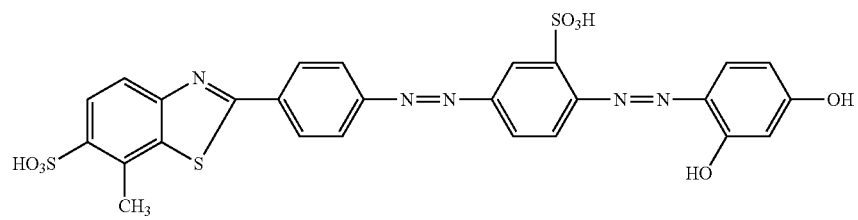
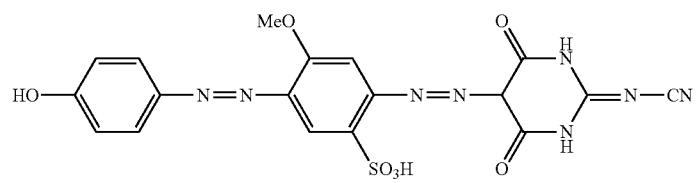
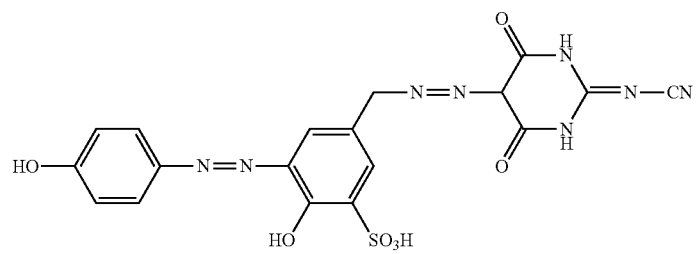
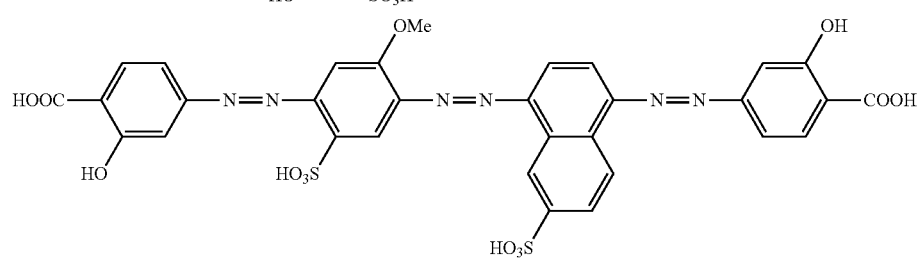

-continued

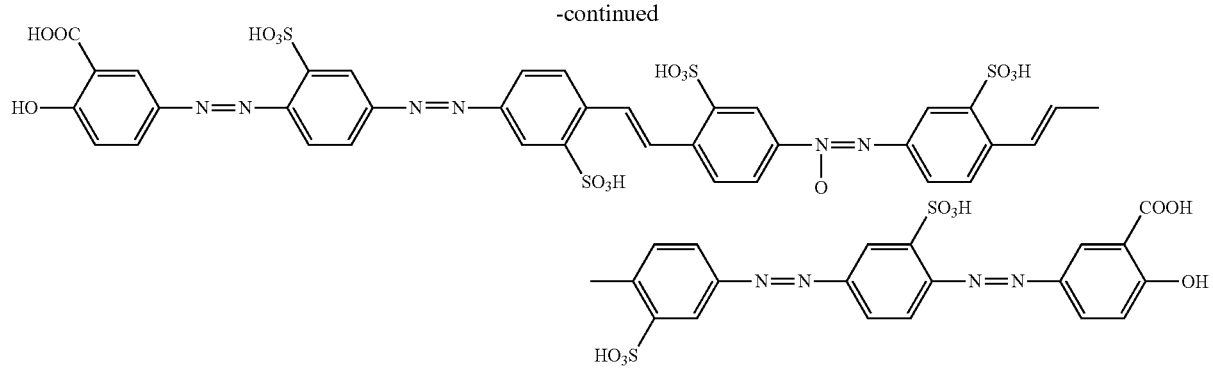

The invention also provides a process for preparing the compounds of formula (1) using known procedures, such as diazotization and coupling steps. Generally, the compounds can be prepared by diazotizing a starting primary aromatic amine, and coupling to another primary aromatic amine. The obtained reaction product is diazotized again and coupled to a third primary aromatic amine which, depending on the desired compound of formula (1), in turn can be diazotized and coupled to a fourth compound to yield the desired compound. In addition, it is also possible to use a nitro group-containing compound as precursor for a primary amino group-containing compound by reducing the nitro group with appropriate reagents.

As an example, the synthesis of the above described preferred dye having the formula

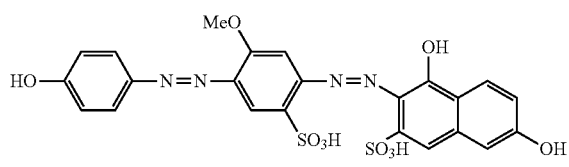

can be accomplished by starting with 5-amino-4-methoxy-2-nitrobenzenesulfonic acid having the formula

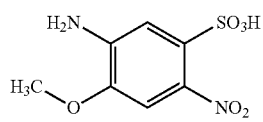 [SMILES: COc1cc([N+](=O)[O-])c(S(=O)(=O)O)cc1N]

which is diazotized and reacted with phenol to a nitro group-containing compound of the following formula.

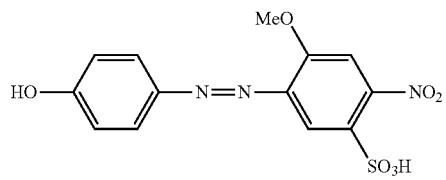 [SMILES: COc1cc([N+](=O)[O-])c(S(=O)(=O)O)cc1N=Nc1ccc(O)cc1]

After reducing the nitro group by an appropriate reducing agent, e.g. a saccharide or sugar, to an amino group, the molecule is diazotized and coupled to di-hydroxy-J-acid having the formula

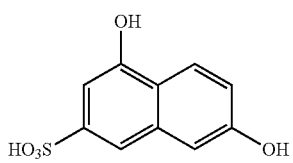 [SMILES: O=S(=O)(O)c1cc(O)c2ccc(O)cc2c1]

to yield the desired dye.

Further, it is possible to react nitro group-containing molecules in presence of a reducing agent to build up the connecting N=N(O) group between two molecules. As an example, the synthesis of the above described dye having the formula

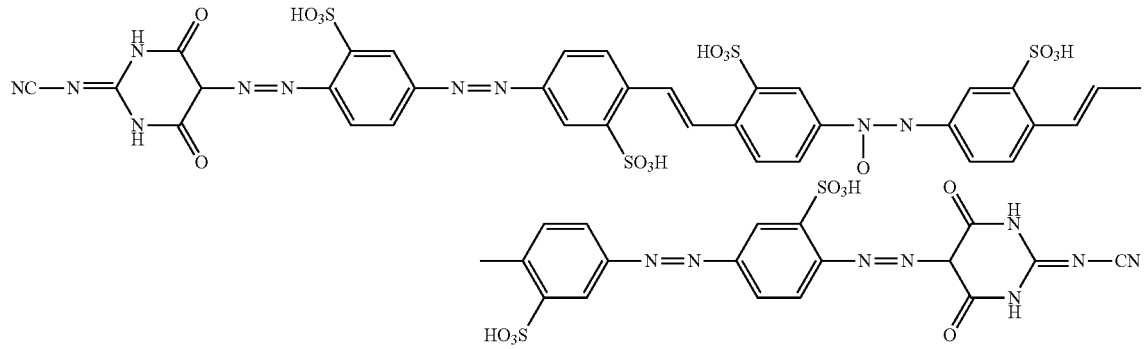

can be accomplished by starting with an appropriate azo compound, such as

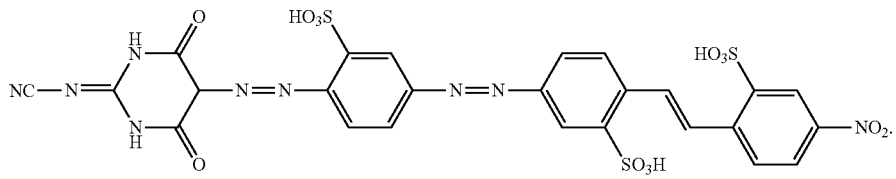 [SMILES: N#CN=C1NC(=O)C(N=Nc2ccc(N=Nc3ccc(/C=C/c4ccc([N+](=O)[O-])cc4S(=O)(=O)O)c(S(=O)(=O)O)c3)cc2S(=O)(=O)O)C(=O)N1]

Two molecules are reacted with each other to build the desired dye by means of a reducing agent, such as sugar.

It is also possible to start with appropriate azo compounds and react those with corresponding amino-containing compounds to yield the desired dyes. As an example, the synthesis of the above described dye having the formula

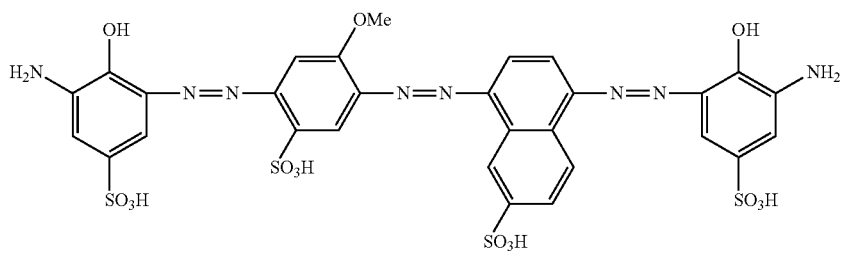 [SMILES: COc1cc(N=Nc2cc(S(=O)(=O)O)cc(N)c2O)c(S(=O)(=O)O)cc1N=Nc1ccc(N=Nc2cc(S(=O)(=O)O)cc(N)c2O)c2ccc(S(=O)(=O)O)cc12]

can be accomplished by starting with an appropriate azo compound, such as 5-amino-8-((4-amino-2-methoxy-5-sulfophenyl)diazenyl)naphthalene-2-sulfonic acid having the formula

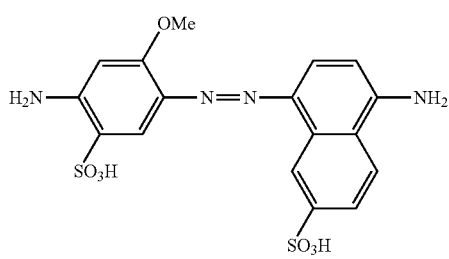 [SMILES: COc1cc(N)c(S(=O)(=O)O)cc1N=Nc1ccc(N)c2ccc(S(=O)(=O)O)cc12]

which is tetra-azotized and coupled with 3-amino-4-hydroxybenzenesulfonic acid
to yield the desired azo dye.

Thus, the preparation involves diazotization and coupling process steps, and optionally reduction steps.

Azo dyes and their production involving diazotization and coupling processes are well-known and familiar to those skilled in the art.

In a further preferred embodiment, generally first a diazonium salt is prepared followed by a coupling reaction. In a suitable embodiment, an amine compound is dissolved or suspended in aqueous hydrochloric or sulfuric acid, and a concentrated aqueous sodium nitrite solution is added. An excess of 2.5-3 equivalents of acid per equivalent of amine compound is further added at a temperature of 0-10° C., preferably of 0-5° C., to generate the diazonium salt. The obtained acidic diazonium salt is added to a, preferably aqueous, solution of the coupling component. The coupling reaction may be completed after mixing of the components.

Another suitable procedure starts with solving the amine compound in water or weak alkaline solution, and adding the calculated amount of sodium nitrite solution to this amine solution. The obtained amine-nitrite solution is stirred into an ice-cooled acid solution which is present in a vessel. It is also possible to add the acid or ice-cooled acid solution to the amine-nitrite solution at a temperature of 0-10° C., preferably of 0-5° C. Depending on the amine compound even 0-40° C. may be possible.

Further, it is possible to dissolve water-insoluble amine compounds in organic solvents, such as ethanol, acetone, pyridine, acetic acid, or formic acid. After addition of acid, diazotizing is carried out in the usual manner by means of sodium nitrite solution. Instead of sodium nitrite, diazotization agents, such as nitrosyl sulfuric acid, nitrosyl chloride, alkylnitrite or nitrous gases also can be used. Further, it is possible to add emulsifiers, dispersing agents or surfactants during the reaction.

The preparation process is not limited to the methods described above, but may be carried out by applying procedures known from the state of the art for diazotization and coupling procedures or as known from the literature (e.g. Klaus Hunger (Editor), *Industrial Dyes*, Wiley-VCH, Weinheim, 2003, pages 19, 28).

In a preferred process of the invention, the compounds of formula (1) are obtained by the following procedure. The process starts with an amine compound of formula (2)

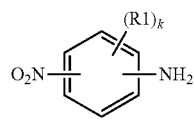
(2)

which is diazotized and coupled, depending on the value of r (0 or 1), with a compound of the general structure of B or C as defined above. If r is 0, the product is diazotized and coupled to a compound of the general structure of C. If r is 1, the product is diazotized and coupled to a compound of the general structure of B followed by diazotizing and coupling to a compound of the general structure of C.

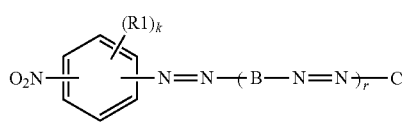
(4)

The resulting compound (4) is treated with a reducing agent, such as sugar, dextrose, formaldehyde, sodium hydrosulfite, or hydrogen, to reduce the nitro group to an amino group and yield compound (5).

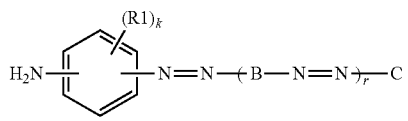
(5)

The compound (5) is diazotized and coupled to a compound of the general structure A to obtain the compound of formula (1).

Furthermore, it is also possible to start with appropriate azo compounds with amino groups to yield the azo dyes of the invention.

Preferred compounds of formula (2) are:

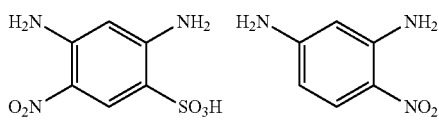

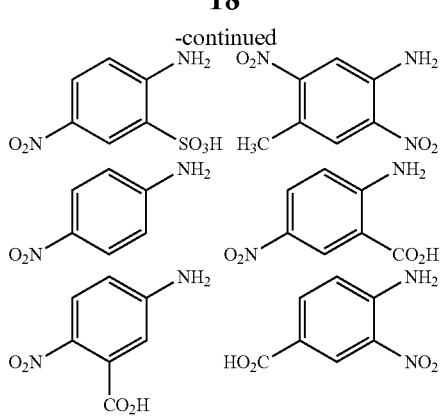

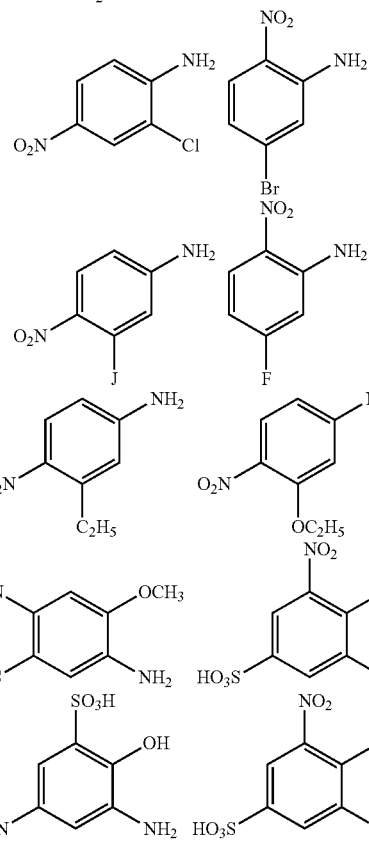

The substituents shown also may be located at other positions of the aromatic rings.

Preferred compounds of formula (4) are:

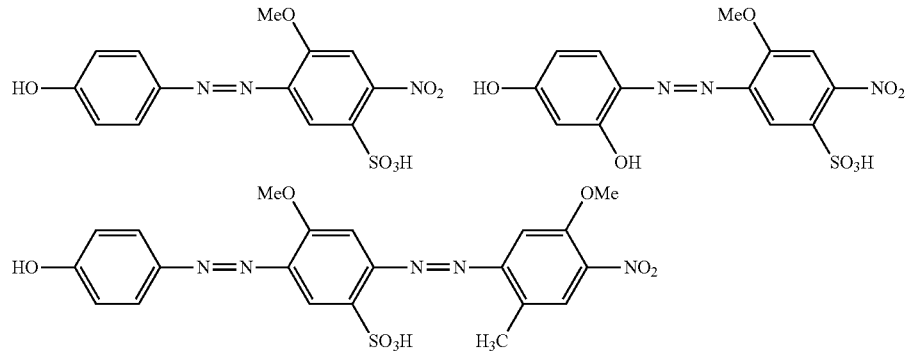

-continued
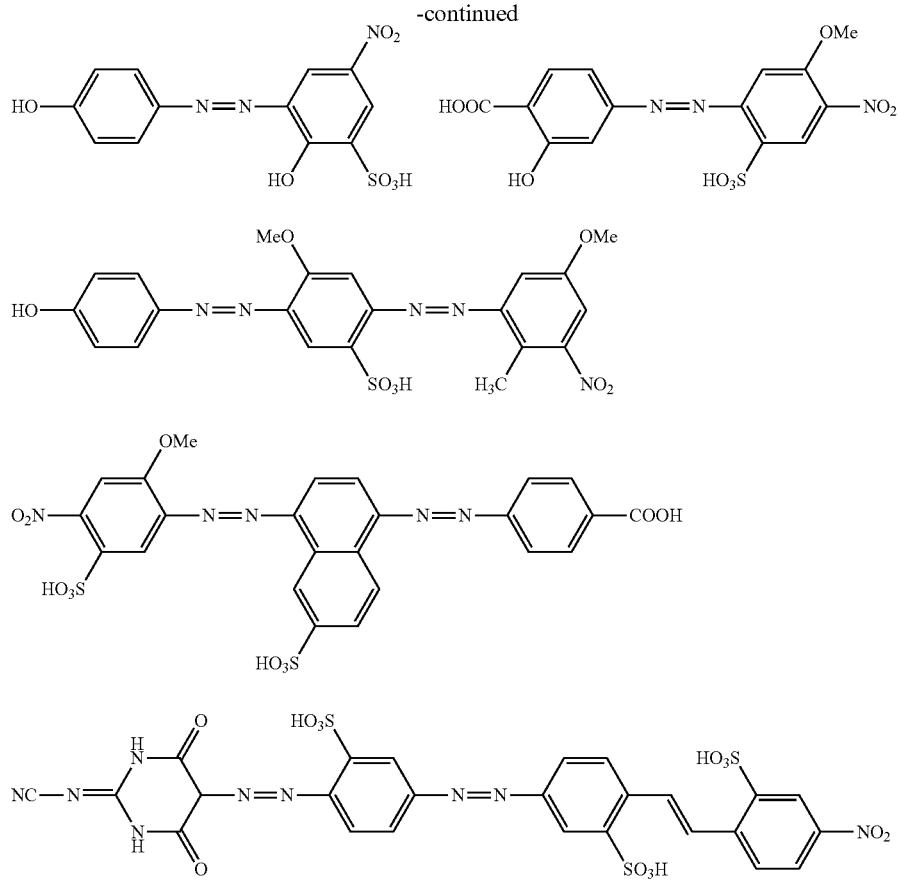
Preferred compounds of formula (5) are:
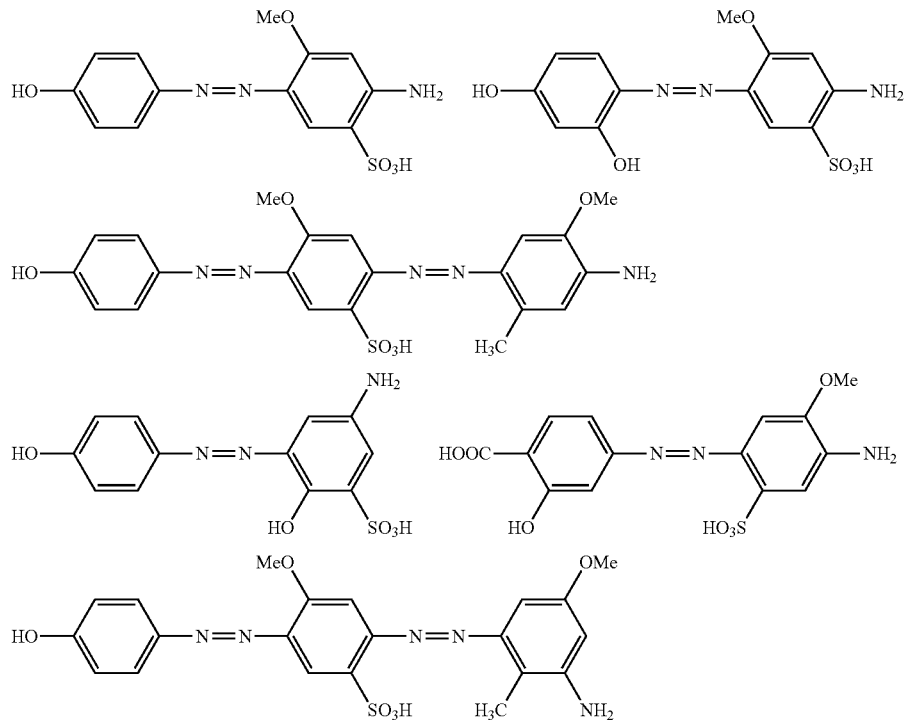

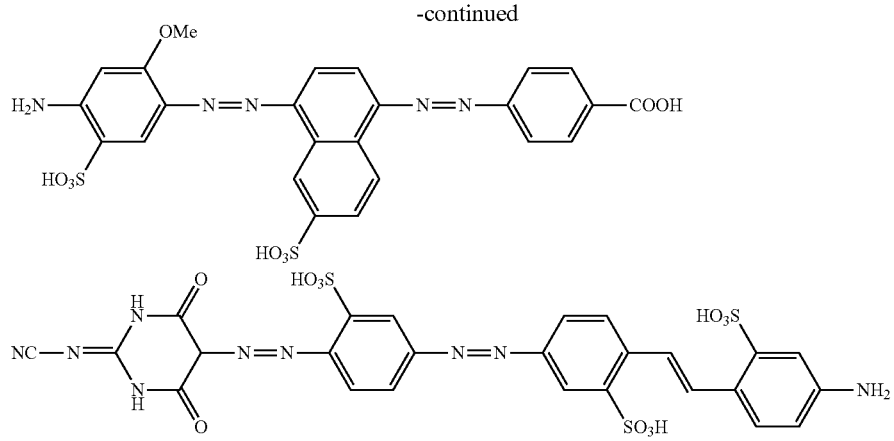

The dyes of formula (1) can be isolated from the reaction medium by conventional processes, for example by salting out with an alkali metal salt, filtering and drying, if appropriate under reduced pressure and at elevated temperature. Depending on the reaction and/or isolation conditions, the dyes of formula (1) can be obtained as free acid, as salt or as mixed salt which contains for example one or more cations selected from alkali metals ion, for example the sodium ion, or an ammonium ion or alkyl ammonium cation, for example mono-, di- or trimethyl-, or -ethyl ammonium cations, or an alkanol ammonium cation, for example mono-, di- or triethanol ammonium cations. The dyes can be converted from the free acid into a salt or into a mixed salt or vice versa or from one salt form into another one by conventional techniques. If desired, the dyes can be further purified by diafiltration, wherein undesired salts and synthesis by-products are separated from the crude anionic dye. The removal of undesired salts and synthesis by-products and a partial removal of water from the crude dye solution can be carried out by means of a semi-permeable membrane by applying a pressure whereby the dye is obtained, without the undesired salts and synthesis by-products, as a solution and if desired as a solid material in a conventional manner. Such procedures belong to the state of the art and are described for example in WO-A 2007/057370.

The compounds of formula (1) can be utilized in form of a liquid formulation, preferably an aqueous liquid formulation, a moist press cake, or in dried form. In the last two cases, when preparing a solution alkylamine is preferably added.

According to a more preferred embodiment of the invention, the compound of formula (1) is present or used in form of an aqueous liquid formulation comprising at least one alkylamine whose one, two or three alkyl radicals may each be substituted by one or two hydroxyl groups and/or amino groups and/or interrupted by one or two oxygen atoms in ether function, the alkylamine being present in an amount of 0.5-15% by weight based on the total weight of the liquid formulation. Preference is given to alkylamines whose two or three alkyl radicals may each be substituted by one or two hydroxyl groups and/or interrupted by one or two oxygen atoms in ether function. Particular preference is given to mono-, di- and trialkanolamines. Preferred alkylamines are ethanolamine, diethanolamine, triethanolamine, dimethylethanolamine, N-methyldiethanolamine, monomethylethanolamine, 2-(2-aminoethoxy)ethanol, aminoethylethanolamine. Particular preference is given to ethanolamine, especially diethanolamine and triethanolamine and ethoxylated or propoxylated triethanolamine.

Suitable additives in the liquid formulation can be $C_1$-$C_4$-alkanols, for example methanol, ethanol, propanol, isopropanol, butanol, isobutanol, sec-butanol or tert-butanol; carboxamides, such as N,N-dimethylformamide or N,N-dimethylacetamide; ketones or keto alcohols, such as acetone, methyl ethyl ketone or 2-methyl-2-hydroxypentane-4-one; mono-, oligo- or polyalkylene glycols or -thioglycols which have $C_2$-$C_6$-alkylene units, such as ethylene glycol, 1,2- or 1,3-propylene glycol, 1,2- or 1,4-butylene glycol, hexane-1,6-diol, diethylene glycol, triethylene glycol, dipropylene glycol, thiodiglycol, polyethylene glycol or polypropylene glycol; other polyols, such as glycerol or hexane-1,2,6-triol; $C_1$-$C_4$-alkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether (butyldiglycol) or triethylene glycol monomethyl ether or triethylene glycol monoethyl ether; $C_1$-$C_4$-alkyl esters of polyhydric alcohols, γ-butyrolactone or dimethylsulfoxide. Suitable solubilizing additives are further lactams, such as ε-caprolactam, pyrrolidin-2-one or N-methylpyrrolidin-2-one, cyclic ureas, such as 1,3-dimethylimidazolidin-2-one or 1,3-dimethylhexahydropyrimid-2-one, and also polyacrylic acids, polyacrylic acid derivatives, polyvinyl acetates, polyvinyl alcohols, polyvinylpyrrolidones, polysiloxanes or copolymers of the respective monomers. It is further possible to use oligomers of ethylene oxide or propylene oxide or derivatives of these oligomers.

The dyes of formula (1) and their salts are particularly suitable for dyeing or printing organic material, fibrous or fiber-containing material, in particular materials containing lignocellulosic material, cellulose and/or polyamide, preferably materials consisting of natural or synthetic polyamides, cellulose, lignocellulosic material, or substrates like wool, leather, textile or paper or board. The material may be of wood and/or straw origin, mechanically and/or chemically produced, in particular by any suitable pulping or refining technique normally employed in papermaking, e.g. by thermomechanical pulping (TMP), chemi-mechanical pulping (CMP), chemithermomechanical pulping (CTMP), groundwood pulping (GW), alkaline sulphate (kraft) pulping, acid sulphite pulping and/or semichemical pulping. The material may also contain or consist of recycled fiber or pulp, especially made of waste paper. Polyamide or lignocellulosic material may be in fibrous or non-fibrous form. The fibrous material is preferably of wood and/or straw origin, mechanically and/or chemically obtained, e.g. by thermo-mechanical pulping (TMP), chemimechanical pulping (CMP), chemithermomechanical pulping (CTMP), groundwood pulping (GW), alkaline sulphate (kraft) pulping, acid sulphite pulping and/or semichemical pulping. The fibrous material or pulp may also contain or consist of recycled fiber or pulp, especially made of waste paper. The pulp used may contain, in addition to the fibrous material, e.g. fillers and/or auxiliary chemicals, before or after dyeing the pulp. In a most preferred embodiment, the material is paper or board. The obtained shades can be orange to brownish, or reddish to brownish. Further, the dyes of formula (1) and their salts are suitable for producing printing inks, especially ink-jet inks, and for using these inks for printing materials, in particular organic or fibrous material, for example materials consisting of natural or synthetic polyamides, cellulose or substrates like wool, leather, textile, paper or board. Preferably, the dyes of formula (1) and their salts are used to dye paper in orange to brownish shades, in particular in brownish shades.

The invention also relates to a process for dyeing or printing organic material, fibrous or fiber-containing material, in particular materials containing lignocellulosic material, cellulose and/or polyamide, preferably lignocellulosic- or cellulose-containing material, wherein the material is brought into contact with the compound of formula (1), wherein that compound is contained in a liquid formulation, a moist press cake, or in dried form, as described above. Preferably the material is brought into contact with an aqueous liquid formulation containing the compound of formula (1). Suitable materials are the same as described above with respect to the use of the dye of formula (1). The material may be of wood and/or straw origin, mechanically and/or chemically produced, in particular by any suitable pulping or refining technique normally employed in papermaking, e.g. by thermomechanical pulping (TMP), chemimechanical pulping (CMP), chemithermomechanical pulping (CTMP), groundwood pulping (GW), alkaline sulphate (kraft) pulping, acid sulphite pulping and/or semichemical pulping. The material may also contain or consist of recycled fiber or pulp, especially made of waste paper. Polyamide or lignocellulosic material may be in fibrous or non-fibrous form. The fibrous material is preferably of wood and/or straw origin, mechanically and/or chemically obtained, e.g. by thermo-mechanical pulping (TMP), chemimechanical pulping (CMP), chemithermomechanical pulping (CTMP), groundwood pulping (GW), alkaline sulphate (kraft) pulping, acid sulphite pulping and/or semichemical pulping. The fibrous material or pulp may also contain or consist of recycled fiber or pulp, especially made of waste paper. The pulp used may contain, in addition to the fibrous material, e.g. fillers and/or auxiliary chemicals, before or after dyeing the pulp. The dyeing of paper can be carried out in the pulp.

The invention also relates to a process for dyeing paper or board, wherein a pulp or a paper sheet or web is brought into contact with an aqueous preparation or formulation as described above. Preferably, the paper sheet or web is contacted with the aqueous preparation in a size press, or in a coating application, preferably in a coating colour.

The following Examples illustrate the invention without limiting its scope.

EXAMPLES

The Examples demonstrate the synthesis of dyes of formula (1) and of comparative dyes, and their use in an aqueous preparation for dyeing paper. The lightfastness of the obtained paper was determined according to the test method described below. In case that products were salted out in the examples, the term x % b.v. means x % of volume of reaction mixture in g salt.

Dyeing Process:

7 parts by weight of chemically bleached pinewood sulfite cellulose and 3 parts by weight of chemically bleached birchwood sulfite cellulose were beaten into water in a mixer. 1 part by weight of the liquid dye preparation was added to this stuff. Paper was made from that after a mixing time of 20 minutes.

Lightfastness Test According to EN ISO 105-B02:

Test for color fastness—Part B02: Color fastness to artificial light: The xenon arc fading lamp test (ISO 105-B02:1994, including amendment 1:1998), which is commonly used by those skilled in the art, was used. Lightfastness is defined by the degree of decomposition of dyeing or printings on paper by sun light or artificial light. In the present test, paper having been dyed and radiated by the xenon arc fading lamp was measured against the standard blue wool scale ranging from 1 (lowest lightfastness) to 8 (highest lightfastness). The blue wool scale consists of 8 different blue dyes on wool with gradually increasing lightfastness from 1 to 8. After radiation of the dyed paper samples by the xenon arc fading lamp in a weather-o-meter (a device which simulates rain and sunshine) the lightfastness was evaluated by comparison with the blue wool scale.

Comparative Example 1

Preparation of Direct Brown 44 According to WO-A 2007/057370

Stage 1:

28.12 g of m-phenylenediamine and 8.76 g of 20% by weight of hydrochloric acid were added to 344 ml of water. Ice was added in an amount of 338 g. Then, 15.04 g of sodium nitrite were introduced, followed by the dropwise addition of 78.86 g of 20% by weight hydrochloric acid within 50 minutes at <3° C. After 10 minutes further 1.73 g of m-phenylenediamine were added and a pH of 3 was set using 13 g of aqueous sodium hydroxide solution (25% by weight). This was followed by stirring at 3° C. for 1 hour.

Stage 2:

To a solution of 34.6 g of sulfanilic acid in 273.46 g of water and 32.4 g of aqueous sodium hydroxide solution (25% by weight) were added 279 g of ice and 68.9 g of sodium nitrite. The mixture was admixed with 82.76 g of hydrochloric acid (20% by weight) at 0-5° C. and subsequently stirred for 30 minutes. The obtained product was combined with the stage 1 product at 20° C. in the course of 90 minutes. All the time, the pH was maintained at pH 5 using aqueous sodium hydroxide solution (25% by weight). After 3 hours at 20° C. the obtained mixture was adjusted to pH 7.5 and then heated to 55-60° C. Hydrochloric acid (20% by weight) was used to adjust the pH to 1, and the solids were filtered off with suction and washed with water to obtain about 300 g of a moist press cake of Direct Brown 44 whose solids content was 22% by weight (sodium content: <0.5% by weight in the dry material).

Production of a Liquid Formulation of Direct Brown 44:

80.33 g of the moist press cake (corresponding to 20.0 g dry weight) were dissolved with 5.25 g of diethanolamine, 3.44 g of aqueous ammonium hydroxide solution (25% $NH_3$), 5 g of polyethylene glycol (average molecular weight: 200) and water to form 100 g of liquid dye.

Paper was made using the above described dyeing process.

Lightfastness was measured according to EN ISO 105-B02 with the result: 1, i.e. lowest lightfastness.

Comparative Example 2

Preparation of Direct Yellow 11 According to WO-A 2007/057370

1.10 kg of 5-nitro-o-toluenesulfonic acid (83% by weight, 33.5 mol) was added to 1.5 l of water. A total of 278 g of solid lithium hydroxide (56% pure by weight) was then added continuously in small amounts. 67 g of diethanolamine were added and the mixture was stirred at 50-60° C. for 20 hours and then at 58° C. for 5 hours. Thereafter, 1.7 liters of water were added and a pH of 9.0 was set with glacial acetic acid. The dye was dissolved with 1.85 kg of urea and adjusted to final color strength, compared to a previously defined standard sample, with water. The product was obtained in an amount of 7.26 kg and had a dye content of about 12% by weight.

Direct Brown 44 (D.Br. 44) and Direct Yellow 11 (D.Y. 11) were mixed according to WO-A 2007/057370 resulting in the following composition:
9.4% D.Br. 44 (dry)
6.6% D.Y. 11 (dry)
3.13% Diethanolamine
0.43% NH$_3$
2.50% Polyethylene glycol 200 and
water,
to form 100 g of liquid dye.

Paper was made using the above described dyeing process.
Lightfastness was measured according to EN ISO 105-B02 with the result: 1, i.e. lowest lightfastness.

EXAMPLE 1

Stage 1

In a 2 L beaker with stirrer, 1000 mL of distilled water and 71.88 g (289.86 mmol) of 5-amino-4-methoxy-2-nitrobenzenesulfonic acid (calculated as free acid) were mixed at 50° C. resulting in pH=7.1. To this solution, 44 mL (318.84 mmol) of sodium nitrite solution (500 g/L) was added. This solution then was dripped within 20 min. to 100 mL of hydrochloric acid (30% b.w.), 100 mL of dist. water, and 150 g of ice at −10° C. During addition the temperature was controlled at 20-25° C. The suspension of the diazonium salt was stirred for 2 hours at 20-25° C. Excess of nitrite was destroyed by addition of amidosulfonic acid. 1630 g of diazonium salt suspension was obtained.

Coupling:
Into a 2 L beaker containing 14.3 g (152.2 mmol) of phenol in 250 mL of dist. water at room temperature, adjusted with sodium carbonate to pH 7.5-8.0, 815 g of diazonium salt suspension of stage 1 was added within 20 min. at constant pH 7.5, controlled by 140 mL of sodium carbonate solution (20% b.v.). The batch was stirred for 1 hour at room temperature, pH 7.5.

Reduction with Sugar:
To 1515 g of suspension (from the coupling step) at 50° C., mixed with 46 mL of caustic soda (400 g/L) to obtain pH 11.3-11.5, was added a solution of 40.8 g (205.79 mmol) of dextrose in 200 mL of dist. water within 10 min. During the addition the temperature is increased to 65° C. After having added the solution the pH decreased to <10 and was adjusted again to 11.3 by using 25 mL of caustic soda (400 g/L). The reaction mixture was stirred for 20 min. at 68-70° C. and 155 mL of HCl (30% b.w.), and 300 g of NaCl (solid) were added. The product was isolated by filtration to yield 113.7 g of press cake (145 mmol of stage 1 product).

Stage 2
In a 1 L beaker with stirrer, 250 mL of distilled water and 22.7 g (29 mmol) of press cake stage 1 product were mixed at room temperature. Lithium hydroxide (1.4 g) was added resulting in pH=7.5-8.0. To this solution, 25 mL (36.23 mmol) of sodium nitrite solution (100 g/L) was added. This solution then was dripped within 20 min. to 20 mL of hydrochloric acid (30% b.w.), 25 mL of dist. water, and 50 g of ice at −10° C. During addition the temperature was controlled at 10° C. The suspension of the diazonium salt was stirred for 2 hours at 10° C. Excess of nitrite was destroyed by addition of amidosulfonic acid. 472 g of diazonium salt suspension was obtained.

Coupling:
Into a 1 L beaker containing 1.9 g (17.39 mmol) of m-toluidine, 236 g of diazonium salt suspension of stage 2 was added within 10 min. at constant pH 7.5, controlled by 48 mL of sodium carbonate solution (20% b.v.). The batch was stirred for 2 hours at room temperature, pH 8. 500 mL of solution was salted out using 100 g of sodium chloride (20% b.v.). The product was isolated by filtration to yield 6.7 g of press cake (14.5 mmol of stage 2 product). The moist press cake was dried in vacuum at 60° C. to yield 4.5 g of product of formula

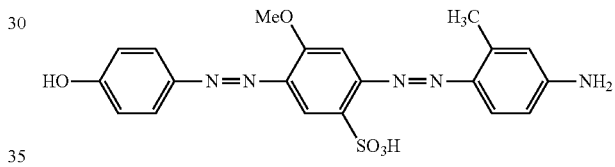

Paper was made using the above described dyeing process.
Lightfastness was measured to EN ISO 105-B02 with the result: 3.

EXAMPLE 2

Stage 1

In a 2 L beaker with stirrer, 1000 mL of distilled water and 71.88 g (289.86 mmol) of 5-amino-4-methoxy-2-nitrobenzenesulfonic acid (calculated as free acid) were mixed at 50° C. resulting in pH=7.1. To this solution, 44 mL (318.84 mmol) of sodium nitrite solution (500 g/L) was added. This solution then was dripped within 20 min. to 100 mL of hydrochloric acid (30% b.w.), 100 mL of dist. water, and 150 g of ice at −10° C. During addition the temperature was controlled at 20-25° C. The suspension of the diazonium salt was stirred for 2 hours at 20-25° C. Excess of nitrite was destroyed by addition of amidosulfonic acid. 1630 g of diazonium salt suspension was obtained.

Coupling:
Into a 2 L beaker containing 14.3 g (152.2 mmol) of phenol in 250 mL of dist. water at room temperature, adjusted with sodium carbonate to pH 7.5-8.0, 815 g of diazonium salt stage 1 suspension was added within 20 min. at constant pH 7.5, controlled by 140 mL of sodium carbonate solution (20% b.v.). The batch was stirred for 1 h at room temperature, pH 7.5.

Reduction with Sugar:
To 1515 g of suspension (of the coupling step) at 50° C., mixed with 46 mL of caustic soda (400 g/L) at pH 11.3-11.5, was added a solution of 40.8 g (205.79 mmol) of dextrose in 200 mL of dist. water within 10 min. During the addition the temperature was increased to 65° C. After addition of the solution the pH has decreased to <10 and was adjusted again to 11.3 by 25 mL of caustic soda (400 g/L). The reaction mixture was stirred for 20 min. at 68-70° C. and 155 mL of HCl (30% b.w.), and 300 g of NaCl (solid) were added. The product was isolated by filtration to yield 113.7 g of press cake (145 mmol of stage 1 product).

Stage 2

In a 1 L beaker with stirrer, 250 mL of distilled water and 22.7 g (29 mmol) of press cake stage 1 product were mixed at room temperature. Lithium hydroxide (1.4 g) was added resulting in pH=7.5-8.0. To this solution, 25 mL (36.23 mmol) of sodium nitrite solution (100 g/L) was added. This solution then was dripped within 20 min. to 20 mL of hydrochloric acid (30% b.w.), 25 mL of dist. water, and 50 g of ice at −10° C. During addition the temperature was controlled at 10° C. The suspension of the diazonium salt was stirred for 2 hours at 10° C. Excess of nitrite was destroyed by addition of amidosulfonic acid. 472 g of diazonium salt suspension was obtained.

Coupling:

Into a 1 L beaker containing 1.64 g (17.39 mmol) of phenol in 100 mL of dist. water at room temperature, adjusted with sodium carbonate to pH 7.5-8.0, 236 g of diazonium salt stage 2 suspension was added within 10 min. at constant pH 7.5, controlled by 45 mL of sodium carbonate solution (20% b.v.). The batch was stirred for 2 hours at room temperature, pH 7.8. 450 mL of solution was salted out using 67.5 g of sodium chloride (15% b.v.). The product was isolated by filtration to yield 4.2 g of press cake (14.5 mmol of product stage 2). The moist press cake was dried in vacuum at 60° C. to yield 2.9 g of product of formula

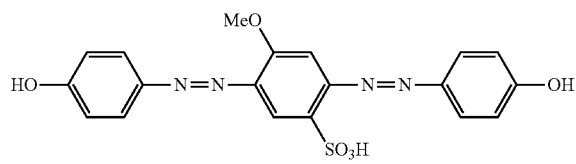

Paper was made using the above described dyeing process.

Lightfastness was measured to EN ISO 105-B02 with the result: 3.

EXAMPLE 3

Stage 1

In a 2 L beaker with stirrer, 1000 mL of distilled water and 71.88 g (289.86 mmol) of 5-amino-4-methoxy-2-nitrobenzenesulfonic acid (calculated as free acid) were mixed at 50° C. resulting in pH=7.1. To this solution, 44 mL (318.84 mmol) of sodium nitrite solution (500 g/L) was added. This solution then was dripped within 20 min. to 100 mL of hydrochloric acid (30% b.w.), 100 mL of dist. water, and 150 g of ice at −10° C. During addition the temperature was controlled at 20-25° C. The suspension of the diazonium salt was stirred for 2 hours at 20-25° C. Excess of nitrite was destroyed by addition of amidosulfonic acid. 1630 g of diazonium salt suspension was obtained.

Coupling:

Into a 2 L beaker containing 14.3 g (152.2 mmol) of phenol in 250 mL of dist. water at room temperature, adjusted with sodium carbonate to pH 7.5-8.0, 815 g of diazonium salt stage 1 suspension was added within 20 min. at constant pH 7.5, controlled by 140 mL of sodium carbonate solution (20% b.v.). The batch was stirred for 1 h at room temperature, pH 7.5.

Reduction with Sugar:

To 1515 g of suspension (of the coupling stage) at 50° C., mixed with 46 mL of caustic soda (400 g/L) at pH 11.3-11.5, was added a solution of 40.8 g (205.79 mmol) of dextrose in 200 mL of dist. water within 10 min. During the addition the temperature was increased to 65° C. After addition of the solution the pH had decreased to <10 and was adjusted again to 11.3 by 25 mL of caustic soda (400 g/L). The reaction mixture was stirred for 20 min. at 68-70° C. and 155 mL of HCl (30% b.w.), and 300 g of NaCl (solid) were added. The product was isolated by filtration to yield 113.7 g of press cake (145 mmol of stage 1 product).

Stage 2

In a 1 L beaker with stirrer, 375 mL of distilled water and 34.1 g (43.48 mmol) of press cake stage 1 product were mixed at room temperature. Lithium hydroxide (2.3 g) was added resulting in pH=8.6. To this solution 25 mL (36.23 mmol) of sodium nitrite solution (100 g/L) was added. This solution then was dripped within 20 min. to 30 mL of hydrochloric acid (30% b.w.), 50 mL of dist. water, and 50 g of ice at −10° C. During addition the temperature was controlled at 10-15° C. The suspension of the diazonium salt was stirred for 2 hours at 10-15° C. Excess of nitrite was destroyed by addition of amidosulfonic acid. 618.8 g of diazonium salt suspension was obtained.

Coupling:

Into a 1 L beaker containing 2.4 g (15.94 mmol) of cyanoimino barbituric acid, solved with sodium carbonate solution in 150 mL of dist. water at pH 7.5, 206.3 g of diazonium salt stage 2 suspension was added within 5 min. at constant pH 7.5, controlled by 60 mL of sodium carbonate solution (20% b.v.). The batch was stirred for 2 hours at room temperature, pH 8.6. The product was isolated by filtration to yield 23.6 g of press cake (14.5 mmol of stage 2 product). The moist press cake was dried in vacuum at 60° C. to yield 5.6 g of product of formula

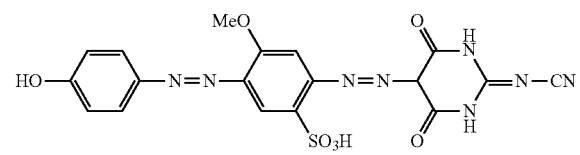

Paper was made using the above described dyeing process.

Lightfastness was measured to EN ISO 105-B02 with the result: 3.

EXAMPLE 4

Stage 1

In a 2 L beaker with stirrer, 1000 mL of distilled water and 71.88 g (289.86 mmol) of 5-amino-4-methoxy-2-nitrobenzenesulfonic acid (calculated as free acid) were mixed at 50° C. resulting in pH=7.1. To this solution, 44 mL (318.84 mmol) of sodium nitrite solution (500 g/L) was added. This solution then was dripped within 20 min. to 100 mL of hydrochloric acid (30% b.w.), 100 mL of dist. water, and 150 g of ice at −10° C. During addition the temperature was controlled at 20-25° C. The suspension of the diazonium salt was stirred for 2 hours at 20-25° C. Excess of nitrite was destroyed by addition of amidosulfonic acid. 1630 g of diazonium salt suspension was obtained.

Coupling:

Into a 3 L beaker containing 19.5 g (152.2 mmol) of barbituric acid in 700 mL of dist. water at room temperature, adjusted with 7.6 g of LiOH to pH 10.8, 815 g of diazonium salt stage 1 suspension was added within 15 min. at constant pH 7.5, controlled by 112 mL of sodium carbonate solution (20% b.v.). The batch was stirred for 1 hour at room temperature, pH 7.8 yielding 1.75 L of suspension of coupling.

Reduction with Sugar:

To 1.75 L of suspension at 50° C., mixed with 76 mL of caustic soda (400 g/L) at pH 12, was added a solution of 40.8 g (205.79 mmol) of glucose in 150 mL of dist. water within 10 min. During the addition the temperature was increased to 70° C. After addition of the solution the pH had decreased to 10. The reaction mixture was stirred for 20 min. at 68-70° C. and 65 mL of HCl (30% b.w.), and 200 g of NaCl (solid) were added. The product was isolated by filtration to yield 93.1 g of press cake (145 mmol of stage 1 product).

Stage 2

In a 1 L beaker with stirrer, 400 mL of distilled water and 18.6 g (29 mmol) of press cake stage 1 product were mixed at room temperature. Lithium hydroxide (1.7 g) was added resulting in pH=8.6. To this solution, 25 mL (36.23 mmol) of sodium nitrite solution (100 g/L) was added. This solution then was dripped within 20 min. to 25 mL of hydrochloric acid (30% b.w.), 50 mL of dist. water, and 50 g of ice at −5° C. During addition the temperature was controlled at 15° C. The suspension of the diazonium salt was stirred for 2 hours at 15° C. Excess of nitrite was destroyed by addition of amidosulfonic acid. 634.6 g of diazonium salt suspension was obtained.

Coupling:

Into a 1 L beaker containing 1.5 g (15.94 mmol) of phenol, solved in 150 mL of dist. water at pH 7.5, 317.3 g of diazonium salt stage 2 suspension was added within 10 min. at constant pH 7.5, controlled by 50 mL of sodium carbonate solution (20% b.v.). The batch was stirred for 1.5 hours at room temperature, pH 8.4. The product was isolated by filtration to yield 10.9 g of press cake (14.5 mmol of stage 2 product). The moist press cake was dried in vacuum at 60° C. to yield 3.4 g of product of formula

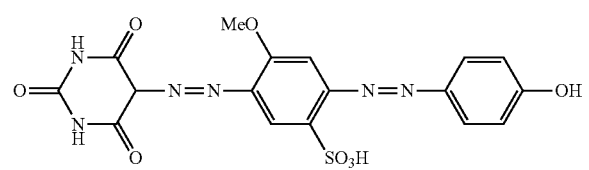 [SMILES: COc1cc(N=Nc2ccc(O)cc2)c(S(=O)(=O)O)cc1N=NC1C(=O)NC(=O)NC1=O]

Paper was made using the above described dyeing process.

Lightfastness was measured to EN ISO 105-B02 with the result: 3.

All papers obtained in the Examples and Comparative Examples exhibited brownish shades.

The examples show that the dyes of the invention provide paper with higher lightfastness than paper produced with known dye mixtures.

The invention claimed is:

1. A compound of formula (1)

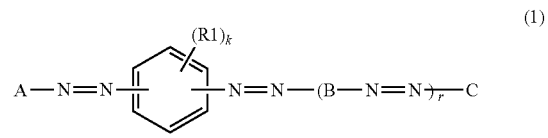

wherein

R1 represents hydrogen; substituted or unsubstituted $C_{1-5}$-alkyl; substituted or unsubstituted $C_{1-5}$-alkoxyl; substituted or unsubstituted aryl; substituted or unsubstituted phenyl; p-$C_{1-5}$-alkoxyphenyl; di($C_{1-5}$-alkyl)amino groups; amino, sulfonic, carboxyl, hydroxyl, halogen, or nitro groups; wherein R1 is attached to the aromatic ring at any position and comprises sulfonic;

k is an integer from 1 to 4, r is an integer of 0 or 1;

A, C represent, independently of each other,

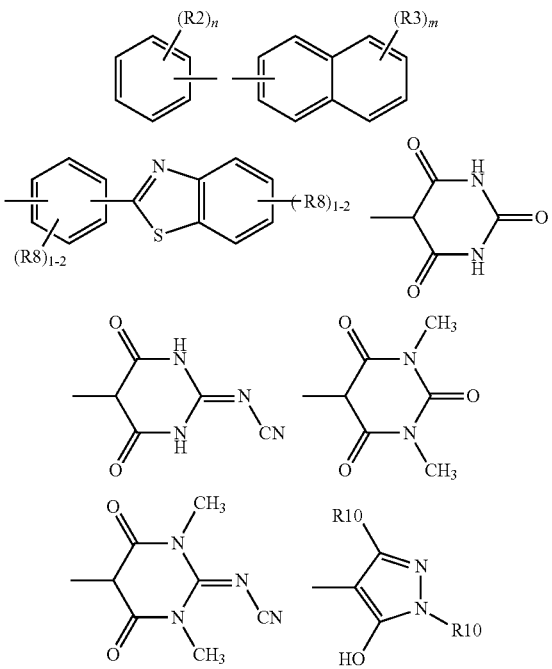

or tautomeric forms

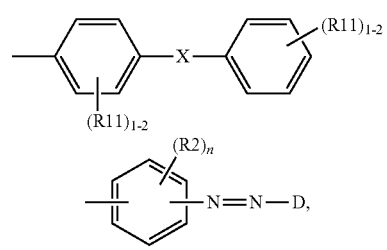

wherein D represents C with the proviso that D is not equal to

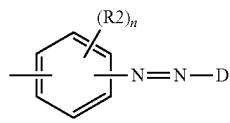

B represents

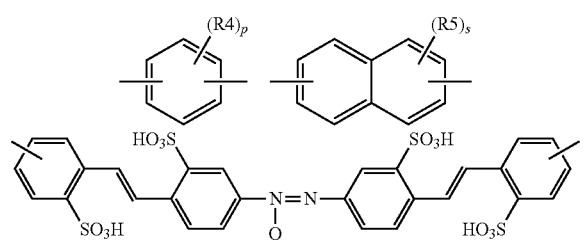

wherein
R2, R3, R4, R5, independently of each other, represent hydrogen; substituted or unsubstituted $C_{1-5}$-alkyl; substituted or unsubstituted $C_{1-5}$-alkoxyl; substituted or unsubstituted aryl; substituted or unsubstituted phenyl; p-$C_{1-5}$-alkoxyphenyl; di($C_{1-5}$-alkyl)amino groups; amino, sulfonic, carboxyl, hydroxyl, halogen, or nitro groups; wherein R2, R3, R4, R5 are attached to the aromatic ring at any position;
and wherein
R8, R10, and R11, independently of each other, represent hydrogen, substituted or unsubstituted $C_{1-4}$-alkyl, substituted or unsubstituted $C_{1-4}$-alkoxy, substituted or unsubstituted aryl, substituted or unsubstituted phenyl, sulfonic, carboxyl, amino, nitro, hydroxyl, or halogen groups, and
X represents O, S, NH, $SO_2$, CH=CH, NHCO, NH—CO—NH, N=N, N=N(O);
m, s independently of each other, are an integer from 1 to 4; and
n, p independently of each other, are an integer from 1 to 3.

wherein
R1 represents hydrogen; substituted or unsubstituted $C_{1-5}$-alkyl; substituted or unsubstituted $C_{1-5}$-alkoxyl; amino, sulfonic, or hydroxyl groups, wherein R1 is attached to the aromatic ring at any position and comprises sulfonic;
k is an integer from 1 to 2;
A, C represent, independently of each other,

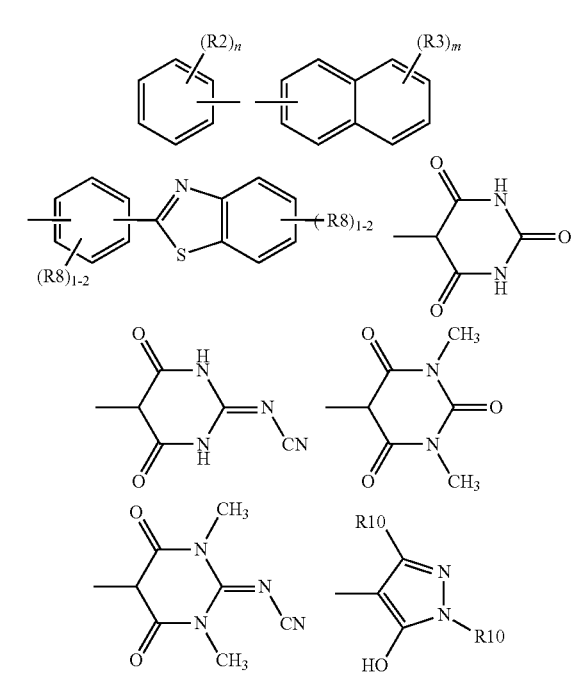

or tautomeric forms
m, n independently of each other, are an integer from 1 to 3;
R2, R3, R8 and R10 are defined as described above.

3. The compound of claim 1, having the following structure:

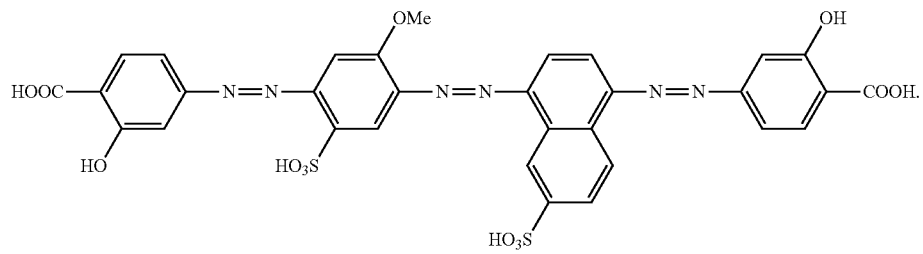

2. The compound of claim 1, having the following structure:

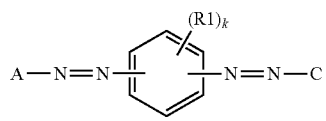

4. The compound of claim 1, having the following structure:

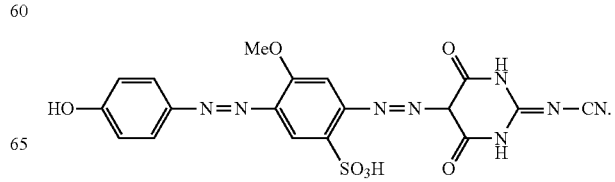

5. The compound of claim 1, having the following structure:

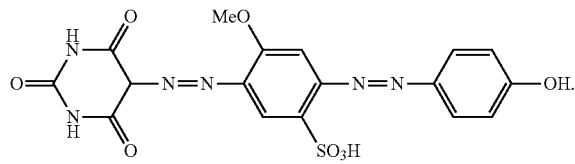

6. The compound of claim 1, having the following structure:

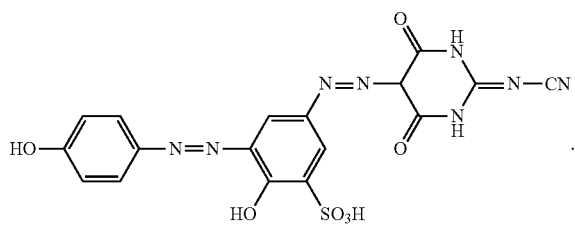 [SMILES: N#CN=C1NC(=O)C(N=Nc2cc(N=Nc3ccc(O)cc3)c(O)c(S(=O)(=O)O)c2)C(=O)N1]

7. The compound of claim 1, having the following structure:

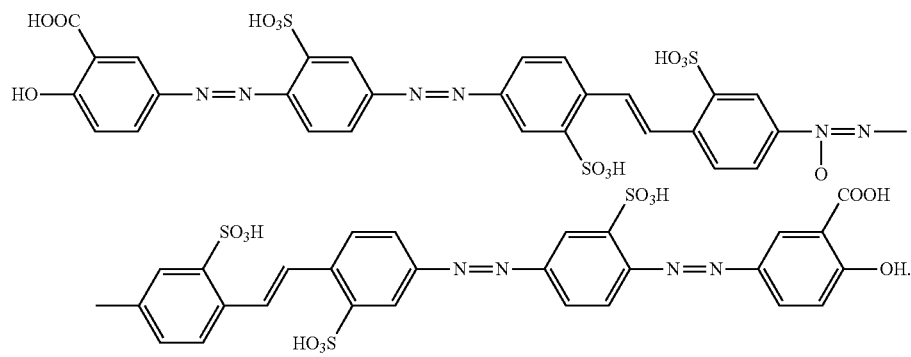

8. The compound of claim 1, wherein in the sulfonic group with the meaning —$SO_3M$, M is a cation.

9. A process for preparing a compound of formula (1) according to claim 1, comprising diazotizing a compound of formula (2)

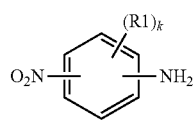

coupling the obtained product with a compound of the general structure of B or C as defined above, depending on the value of r, optionally diazotizing again and coupling to a compound of the general structure C,

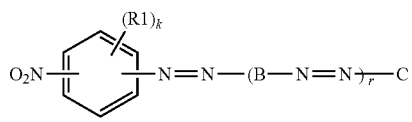

treating the resulting compound (4) with a reducing agent yielding compound (5)

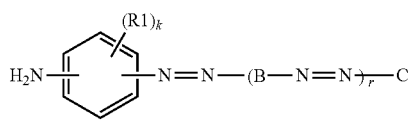

and diazotizing compound (5) and coupling to a compound of the general structure of A I obtain the compound of formula (1).

10. A process for dyeing or printing materials, wherein the material is brought into contact with a compound of formula (1) according to claim 1.

11. The process according to claim 10, wherein the materials used contain cellulose and/or polyamide, in particular cellulose.

12. The process according to claim 10, wherein the material used is paper or board.

13. The process according to claim 10, wherein the material used is a fiber-containing or fibrous material.

14. A product or paper obtainable by a process according to claim 10.

15. The compound of claim 8, wherein M is hydrogen, alkaline metal, earth alkaline metal, ammonium, or mono-, di-, tri- or tetra-substituted ammonium.

16. The compound of claim 15, wherein M is mono-$C_{1-5}$-alkyl-, di-$C_{1-5}$-alkyl-, tri-$C_{1-5}$-alkyl-, tetra-$C_{1-5}$-alkylammonium, mono-$C_{1-5}$-hydroxyalkyl-, di-$C_{1-5}$-hydroxyalkyl-, tri-$C_{1-5}$-hydroxyalkyl-, tetra-$C_{1-5}$-hydroxyalkyl-ammonium, or benzyltri-$C_{1-5}$-hydroxyaklammonium.

* * * * *